United States Patent
Cheng et al.

(10) Patent No.: US 7,236,108 B2
(45) Date of Patent: Jun. 26, 2007

(54) METHOD AND APPARATUS FOR DATA RECOVERY

(75) Inventors: Yuh Cheng, Chu-Pei (TW); Pi-Hai Liu, Taipei (TW)

(73) Assignee: Mediatek Inc., Hsinchu (TW)

( * ) Notice: Subject to any disclaimer, the term of this patent is extended or adjusted under 35 U.S.C. 154(b) by 338 days.

(21) Appl. No.: 10/976,121

(22) Filed: Oct. 28, 2004

(65) Prior Publication Data

US 2005/0097422 A1    May 5, 2005

(30) Foreign Application Priority Data

Nov. 4, 2003    (TW) .............................. 92130799 A

(51) Int. Cl.
*H03M 7/00*    (2006.01)
(52) U.S. Cl. .......................................... 341/59; 341/60
(58) Field of Classification Search .............. 341/50–70
See application file for complete search history.

(56) References Cited

U.S. PATENT DOCUMENTS

| | | | | |
|---|---|---|---|---|
| 5,148,287 | A | * | 9/1992 | Kemmochi et al. ......... 358/3.03 |
| 6,198,420 | B1 | * | 3/2001 | Ryan et al. .................. 341/155 |
| 6,459,394 | B1 | * | 10/2002 | Nadi et al. .................. 341/120 |
| 7,082,056 | B2 | * | 7/2006 | Chen et al. ............... 365/185.2 |

* cited by examiner

*Primary Examiner*—Lam T. Mai
(74) *Attorney, Agent, or Firm*—Thomas, Kayden, Horstemeyer & Risley

(57) ABSTRACT

An apparatus for data recovery includes a multi-level comparison unit, a detection logic unit, and a data composer. The multi-level comparison unit compares an input signal with M different reference signal levels to generate M digital data, the number M being greater than or equal to 2. The detection logic unit is coupled to the multi-level comparison unit, and performs logic operations upon specified lengths over the M digital data obtained from the multi-level comparison unit. The data composer is coupled to the multi-level comparison unit and the detection logic unit. The data composer generates recovered data conforming with a run length encoding constraint based on the M digital data obtained from the multi-level comparison unit and the result obtained from the detection logic unit.

20 Claims, 13 Drawing Sheets

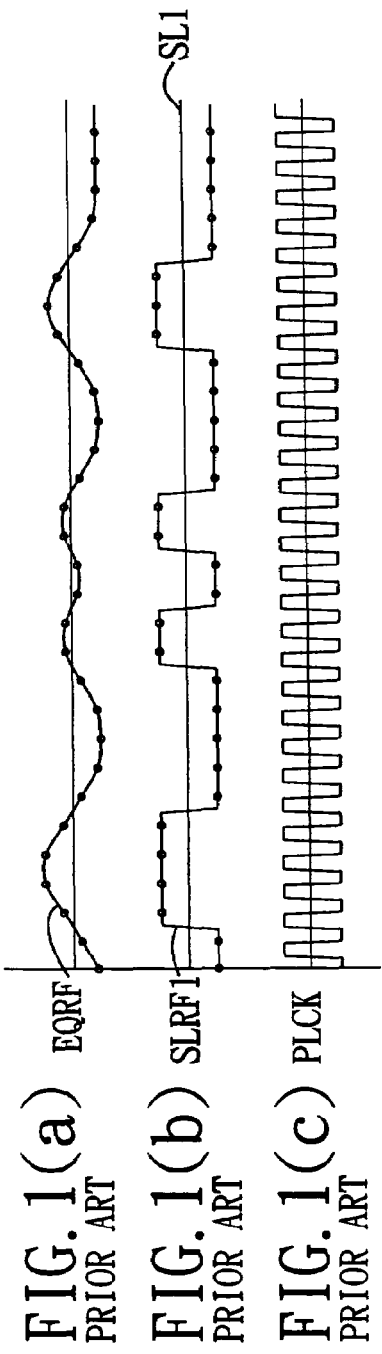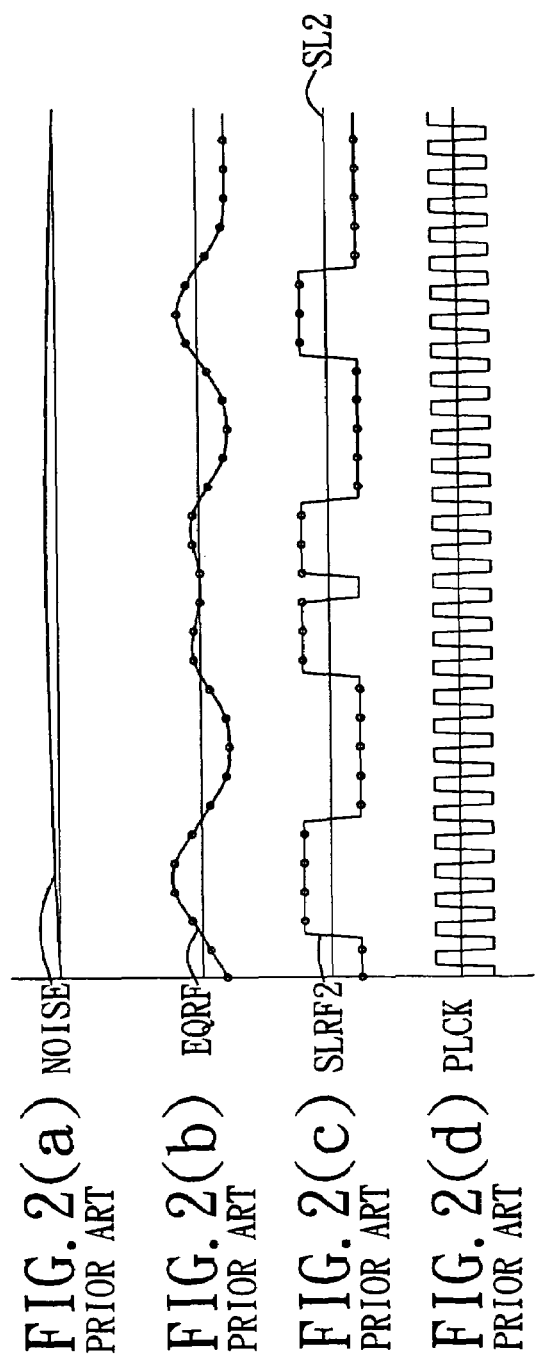

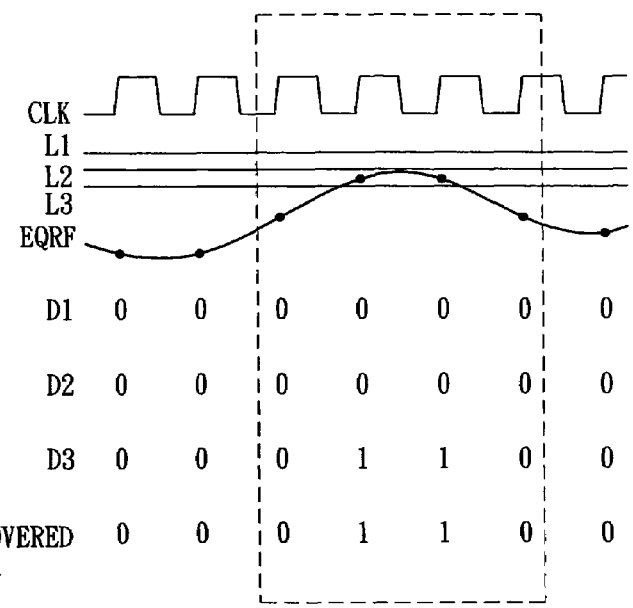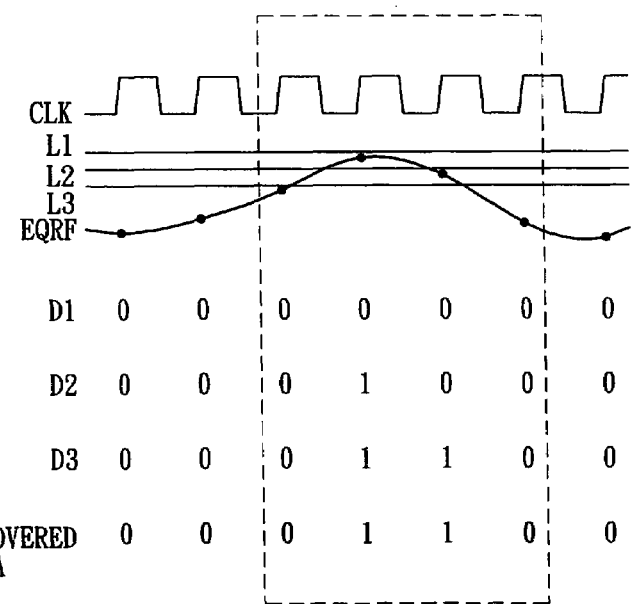

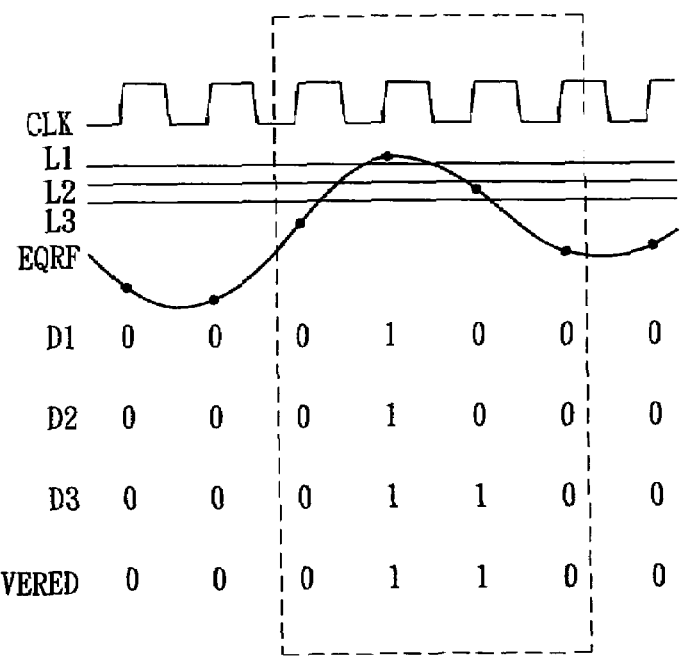

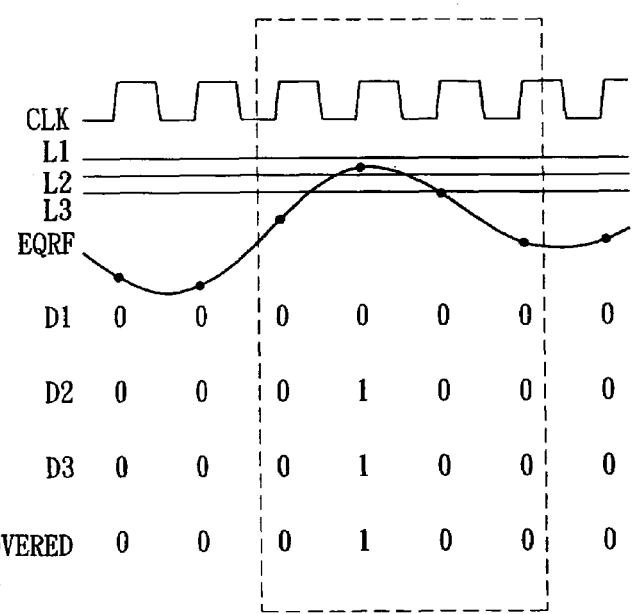
FIG. 11(a)
FIG. 11(b)
FIG. 11(c)
FIG. 11(d)
FIG. 11(e)
FIG. 11(f)
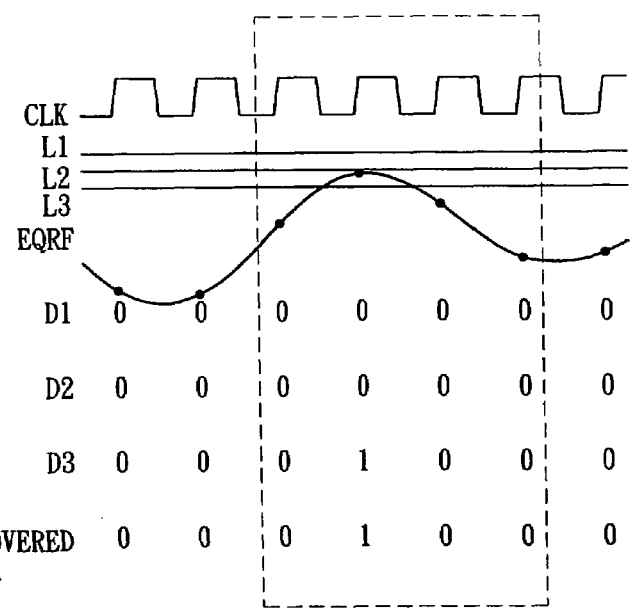
FIG. 12(a)
FIG. 12(b)
FIG. 12(c)
FIG. 12(d)
FIG. 12(e)
FIG. 12(f)

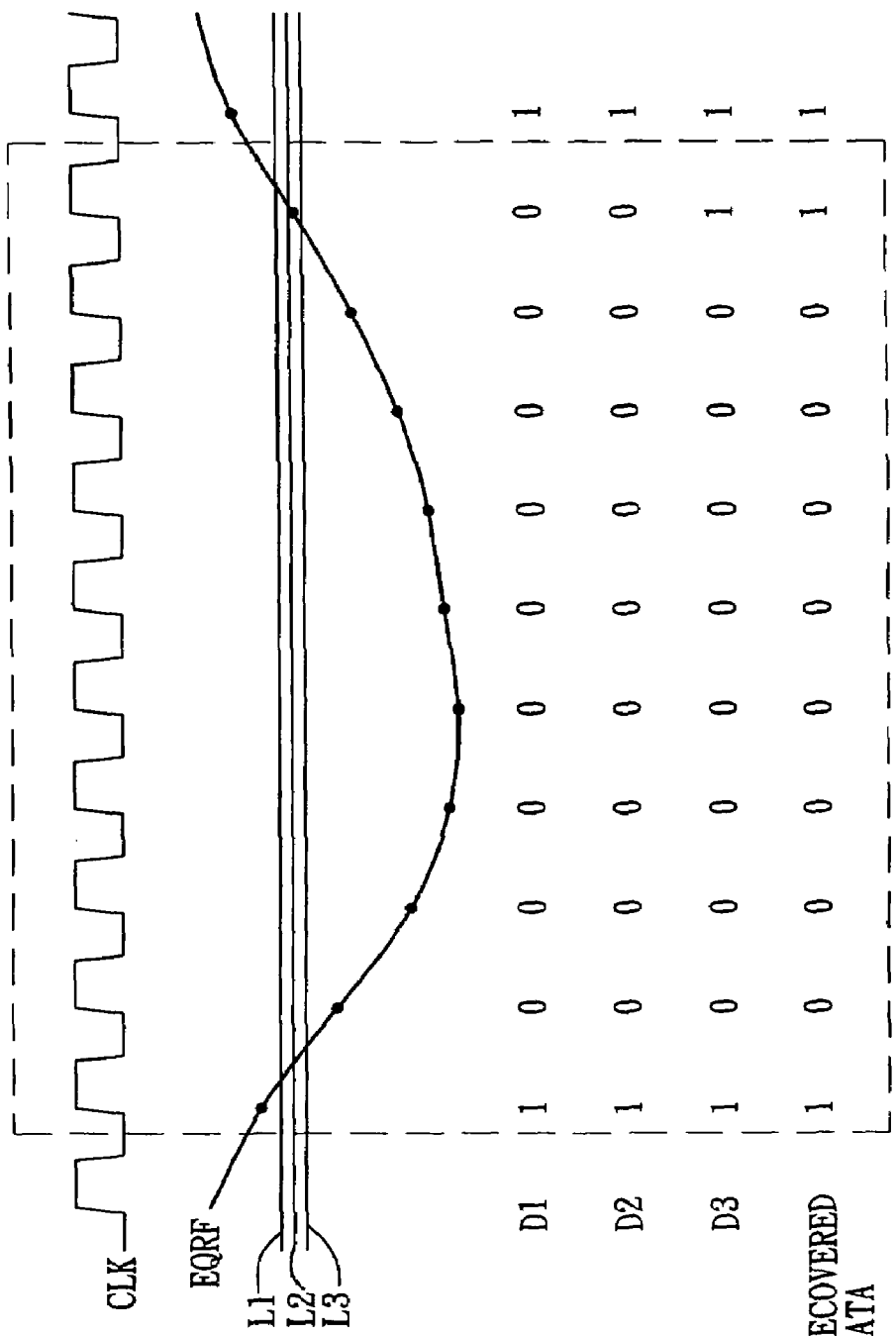

METHOD AND APPARATUS FOR DATA RECOVERY

CROSS-REFERENCE TO RELATED APPLICATION

This application claims priority of Taiwanese application no. 092130799, filed on Nov. 4, 2003.

BACKGROUND OF THE INVENTION

1. Field of the Invention

The invention relates to a method and apparatus for data recovery, and more particularly, to a method and apparatus for data recovery suitable for high-density data recording applications, that can effectively lower the data error rate.

2. Description of the Related Art

When transmitting data and when recording data on a recording medium, such as a floppy disk, an optical disc or a magneto-optic disc, data are modulated into another encoded data format based on a specific encoding rule for suitability to transmission or recording. In order to correctly receive and retrieve the encoded data from the recording medium, the length of the encoded data must conform with a run length limit (abbreviated as RLL). Taking the DVD system as an example, the run length of the RLL encoded data between two neighboring symbols conforms with (d=2, k=10) encoding constraint, where (d) is the minimum run length and (k) is the maximum run length. That is to say, in NRZI (non-return zero inverse) modulation, the number of '0's between two neighboring '1's must be at least (d) but must not exceed (k). On the other hand, in NRZ (non-return zero) modulation, the number of '0's or '1's must be at least (d'=d+1) but must not exceed (k'=k+1). Therefore, the encoded data can be correctly received and decoded. Due to continuous progress in recording techniques, it is foreseeable to have higher density recording in optical discs. For high frequency signals, the amplitudes of the signals however will decrease, and therefore result in lower signal-to-noise ratios (SNR). As a result, encoded data with run length equal to (d) or (d') and (k) or (k') will be affected by low frequency noise, causing incorrect decoding during data retrieving. Referring to FIGS. 1(a) to 1(c), with no consideration of any noise, assuming that an input signal (EQRF) employing RLL (d=1, k=7) in NRZ modulation, if the input signal (EQRF) is decoded based on a reference signal level (SL1), a digital signal (SLRF1) conforming with the run length encoding constraint (d'=d+1) will be generated. As shown in FIGS. 2(a) to 2(d), with noise (NOISE) interference, the amplitude of the input signal (EQRF) however will vary. Thus, an erroneous digital signal (SLRF2), which does not conform with the run length encoding constraint (d'=d+1) and which cannot be correctly recovered, will be generated.

In order to resolve the aforesaid issue, a data detection and correction method disclosed in U.S. Pat. No. 6,111,833, entitled "Data Decoder," use patterns with run lengths of (d'−1), (k'−1), (d−1), (k'+1), (k+1), (d'−2), (d−2), (k'+2), and (k+2) to detect and correct erroneous data bits. Nevertheless, a high-resolution but higher cost analog-to-digital converter is required. Furthermore, no bit errors within a run length (d'−1) can be detected.

SUMMARY OF THE INVENTION

It is therefore the object of the present invention to provide a method and apparatus suitable for high data density recovery that can effectively lower the data error rate.

The method for data recovery of the present invention includes the steps of:

a) comparing an input signal with M reference signal levels to generate M digital data, the number M being greater than or equal to 2;

b) performing logic operations upon specified lengths over the M digital data to obtain a result; and c) generating a recovered data conforming with a run length encoding constraint based on the M digital data obtained in step a) and the result obtained in step b).

In another aspect of the present invention, an apparatus for data recovery is provided. The apparatus includes a multi-level comparison unit, a detection logic unit, and a data composer. The multi-level comparison unit compares an input signal with M different reference signal levels to generate M digital data, the number M being greater than or equal to 2. The detection logic unit performs logic operations upon specified lengths over the M digital data to obtain a result. The data composer generates recovered data conforming with the run length encoding constraint based on the M digital data obtained from the multi-level comparison unit and the result from the detection logic unit. Therefore, the present invention can effectively lower the data error rate.

BRIEF DESCRIPTION OF THE DRAWINGS

Other features and advantages of the present invention will become apparent in the following detailed description of the preferred embodiments with reference to the accompanying drawings, of which:

FIG. 1(a) to 1(c) are timing charts of an input signal (EQRF), a digital signal (SLRF1), and a bit clock signal (PCLK) for illustrating a decoding result of a signal read by a DVD system under ideal noiseless conditions;

FIG. 2(a) to 2(d) are timing charts of a noise signal (NOISE), an input signal (EQRF) affected by the noise signal (NOISE), a digital signal (SLRF2), and a bit clock signal (PCLK) for illustrating a decoding result of a signal read by a DVD system under a background noise condition;

FIGS. 5(a) to 5(f) are timing charts of a sampling clock signal (CLK), an input data signal (EQRF) accompanied with three reference signal levels (L1, L2, L3), first, second and third digital data (D1, D2, D3), and recovered data generated by the first preferred embodiment;

FIGS. 6(a) to 6(f) are timing charts similar to FIGS. 5(a) to 5(f), illustrating the effect of changes in the reference signal levels (L1, L2, L3) upon the digital data (D1, D2, D3) and the recovered data;

FIGS. 7(a) to 7(f) are timing charts similar to FIGS. 5(a) to 5(f), to further illustrate the effect of changes in the reference signal levels (L1, L2, L3) upon the digital data (D1, D2, D3) and the recovered data;

FIGS. 11(a) to 11(f) are timing charts of a sampling clock signal (CLK), an input data signal (EQRF) accompanied with three reference levels (L1, L2, L3) first, second and third digital data (D1, D2, D3), and recovered data generated by the second preferred embodiment;

FIGS. 12(a) to 12 (f) are timing charts similar to FIGS. 11(a) to 11(f), illustrating the effect of changes in the reference signal levels (L1, L2, L3) upon the digital data (D1, D2, D3) and the recovered data;

FIGS. 16(a) to 16(f) are timing charts of a sampling clock signal (CLK), an input data signal (EQRF) accompanied with three reference signal levels (L1, L2, L3), first, second and third digital data (D1, D2, D3), and recovered data generated by the fourth preferred embodiment.

DETAILED DESCRIPTION OF THE PREFERRED EMBODIMENTS

Figure 3:
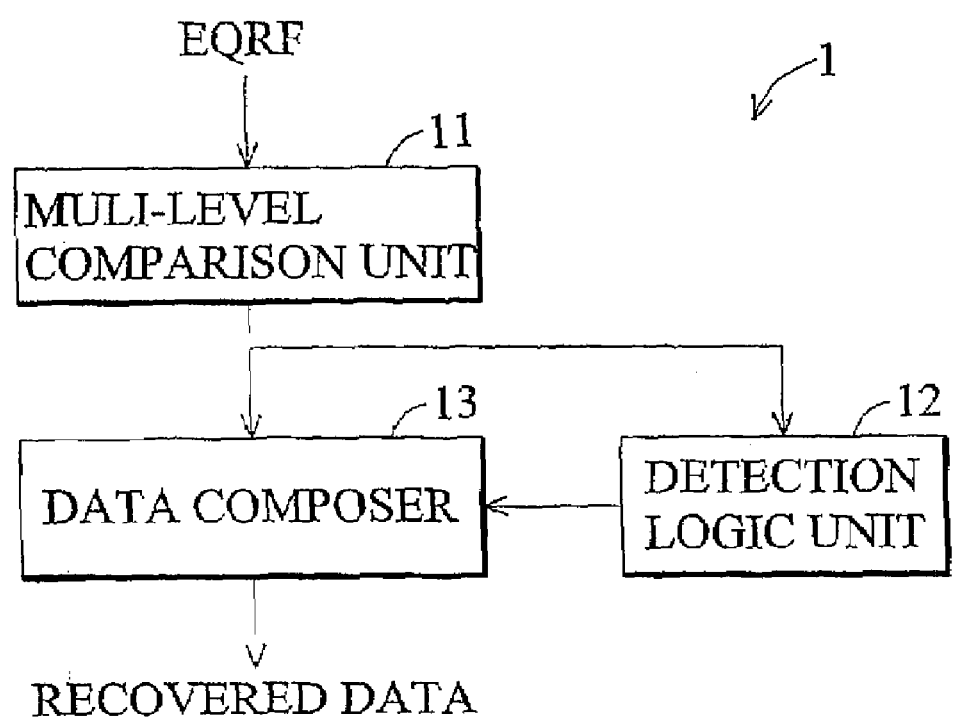
FIG. 3 is a schematic circuit block diagram of the first preferred embodiment of an apparatus for data recovery according to the present invention.

In the detailed disclosure of the present invention with reference to the preferred embodiments, it should be noted herein that same elements are denoted by identical reference numerals throughout the disclosure.

Referring to FIG. 3, a block diagram of an apparatus for data recovery of the first preferred embodiment of the present invention is shown to include a multi-level comparison unit 11, a detection logic unit 12, and a data composer 13.

Figure 4:
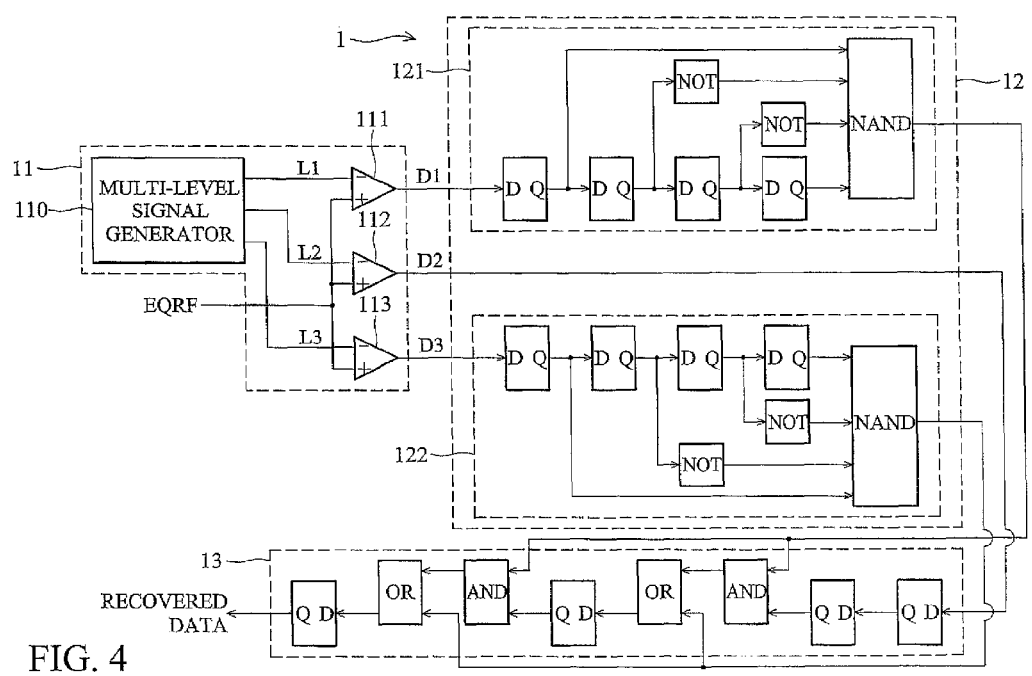
FIG. 4 is a detailed schematic circuit diagram of the first preferred embodiment.

The apparatus 1 is used to perform the following steps:

a) comparing an input signal (EQRF) with M reference signal levels to generate M digital data, the number M being greater than or equal to 2:

As shown in FIG. 4, three sets of digital data (D1, D2, D3) are generated in this embodiment. Preferably, the input signal (EQRF) is an NRZ-encoded signal recorded on an optical disc in a high-density format. The encoded signal employs the RLL encoding constraints (d=1, k=7). That is, the number of '0's or '1's must be at least equal to (d'=d+1) but must not exceed (k'=k+1). The apparatus 1 of this embodiment detects all data segments having a minimum run length d' (i.e., 2) in the input signal (EQRF), and corrects the encoded data based on the detected data segments.

In this embodiment, the multi-level comparison unit 11 includes a multi-level signal generator 110 for generating three different reference signal levels (L1, L2, L3), and three comparators 111, 112, 113 respectively coupled to the multi-level signal generator 110. Each of the comparators 111, 112, 113 compares the input signal (EQRF) (see FIG. 5(b)) with a respective one of the three reference signal levels (L1, L2, L3), and outputs three digital data (D1, D2, D3) (see FIGS. 5(c) to 5(e)) in accordance with a sampling clock signal (CLK) (see FIG. 5(a)) respectively to the detection logic unit 12 and the data composer 13.

b) performing logic operations upon specified lengths over the M digital data (D1, D2, D3) to obtain a result:

Referring again to FIG. 4, the detection logic unit 12 includes first and second detection circuits 121, 122 for detecting data segments (e.g., 1001 and 0110) of the digital data (D1, D3) with a minimum run length limit (d'=2). The detection length in this embodiment is thus equal to (d'+2). The first detection circuit 121 includes four cascaded D-type flip-flops, first and second NOT gates, and a four-input NAND gate. The first D-type flip-flop receives the digital data (D1). The first NOT gate is connected to an output of the second D-type flip-flop. The second NOT gate is connected to an output of the third D-type flip-flop. The NAND gate is connected to outputs of the first and fourth D-type flip-flops, and to the first and second NOT gates. The second detection circuit 122 includes four cascaded D-type flip-flops, first and second NOT gates, and a four-input NOR gate. The first D-type flip-flop receives the digital data (D3). The first NOT gate is connected to an output of the second D-type flip-flop. The second NOT gate is connected to an output of the third D-type flip-flop. The NOR gate is connected to outputs of the first and fourth D-type flip-flops, and to the first and second NOT gates.

The data composer 13 includes four D-type flip-flops, first and second AND gates, and first and second OR gates. The first D-type flip-flop receives the digital data (D2), and has an output connected to the second D-type flip-flop. The output of the NAND gate of the first detection circuit 121 and the output of the second D-type flip-flop serve as inputs to the first AND gate. The output of the first AND gate and the output of the NOR gate of the second detection circuit 122 serve as inputs to the first OR gate. The output of the first OR gate is connected to the third D-type flip-flop. The output of the NAND gate of the first detection circuit 121 and the output of the third D-type flip-flop serve as inputs to the second AND gate. The output of the second AND gate and the output of the NOR gate of the second detection circuit 122 serve as inputs to the second OR gate. The output of the second OR gate is connected to the fourth D-type flip-flop. The recovered data (see FIG. 5(f)) is obtained from the output of the fourth D-type flip-flop.

With further reference to FIGS. 5(a) to 5(f), 6(a) to 6(f), and 7(a) to 7(f), when the second detection circuit 122 found a data segment (0110) in the digital data (D3) conform with the minimum run length limit (d'=2), a logic '1' is outputted to the first and second OR gates in the data composer 13, as a logic '1' output. Similarly, when the first detection circuit 121 detects a data segment (1001) in the digital data (D1) with the minimum run length limit (d'=2), a logic '0' is outputted to the first and second AND gates in the data composer 13, as a logic '0' output.

c) generating recovered data conforming with the run length encoding constraint based on the M digital data (D2) obtained in step a) and the result obtained in step b):

As mentioned hereinabove, when the second detection circuit 122 detects a data segment (0110) in the digital data (D3) with the minimum run length limit (d'=2), a logic '1' is outputted to the first and second OR gates in the data composer 13, as a logic '1' output. Accordingly, the second and third corresponding bits of the digital data (D2) will both become '1'. That is, the data segment (0000) of the digital data (D2) in FIG. 5(d), and the data segment (0100) of the digital data (D2) in FIGS. 6(d) and 7(d) will become (0110), as shown in FIGS. 5(f), 6(f) and 7(f). As a result, the data segments of the digital data (D2) which do not conform with the minimum run length limit (d'=2) are corrected, such that the outputted recovered data from the input signal (EQRF) can be read correctly.

Figure 8:
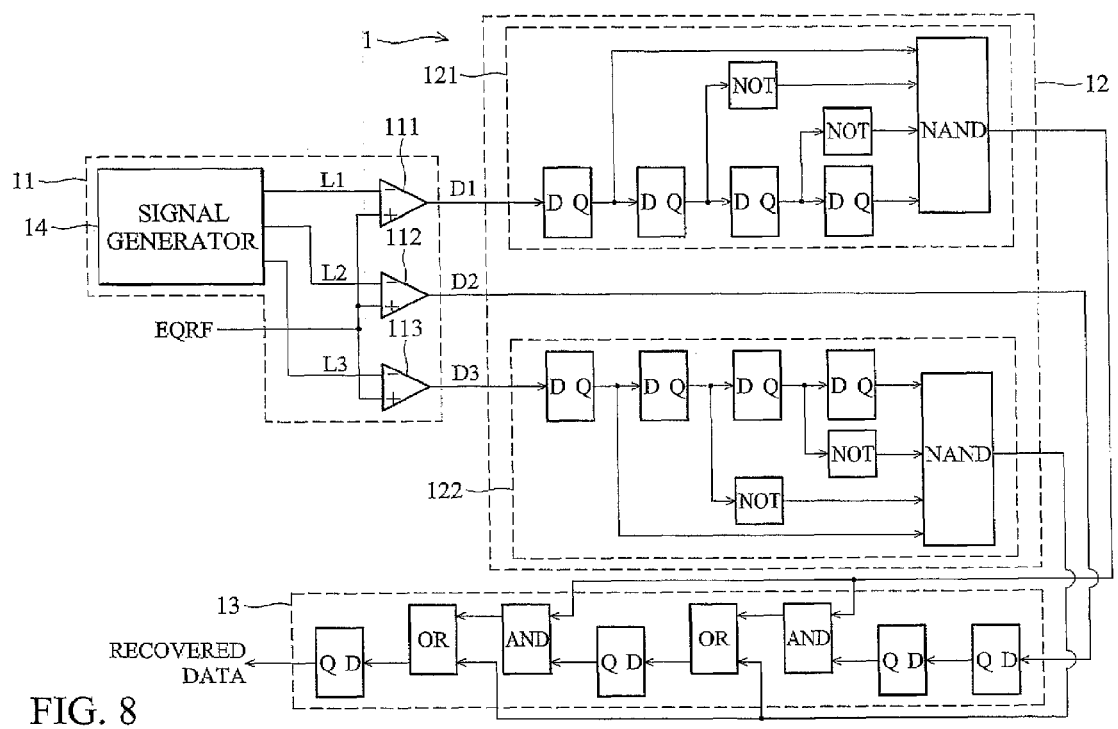
FIG. 8 is a schematic circuit diagram to illustrate a modification of the first preferred embodiment.

FIG. 8 is a modification of the first preferred embodiment of FIG. 4. As illustrated, the multi-level comparison unit 11 generates the reference signal levels (L1, L2, L3) in accordance with the input signal (EQRF) by using a signal generator 14.

Figure 9:
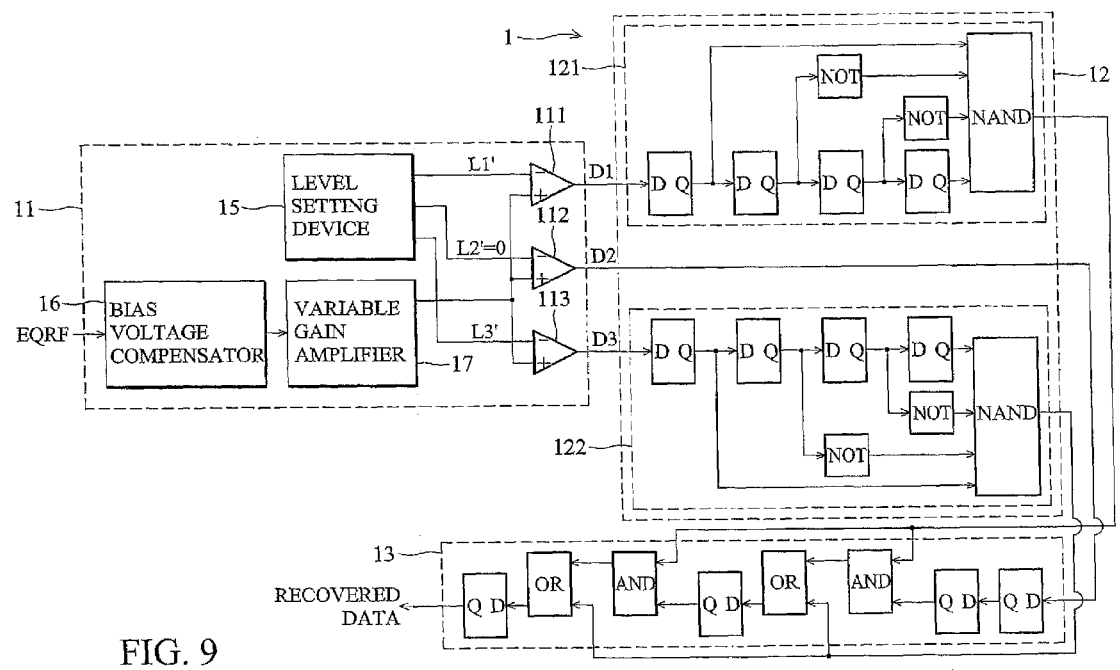
FIG. 9 is a schematic circuit diagram to illustrate another modification of the first preferred embodiment.

FIG. 9 illustrates another modification of the first preferred embodiment of FIG. 4. As illustrated, the multi-level comparison unit 11 is implemented using a level setting device 15, a bias voltage compensator 16, and a variable gain amplifier 17. The level setting device 15 serves to generate the reference signal levels (L1', L2', L3'). The bias voltage compensator 16 receives the input signal (EQRF) and eliminates a direct current bias component therefrom. The variable gain amplifier 17 is coupled to the bias voltage compensator 16 for amplifying an output signal thereof. The comparators 111, 112, 113 of the multi-level comparison unit 11 compare an amplified output of the variable gain amplifier 17 with the reference signal levels (L1', L2', L3') to obtain the digital data (D1, D2, D3), wherein the reference signal level (L2') is set to be 0.

Figure 10:
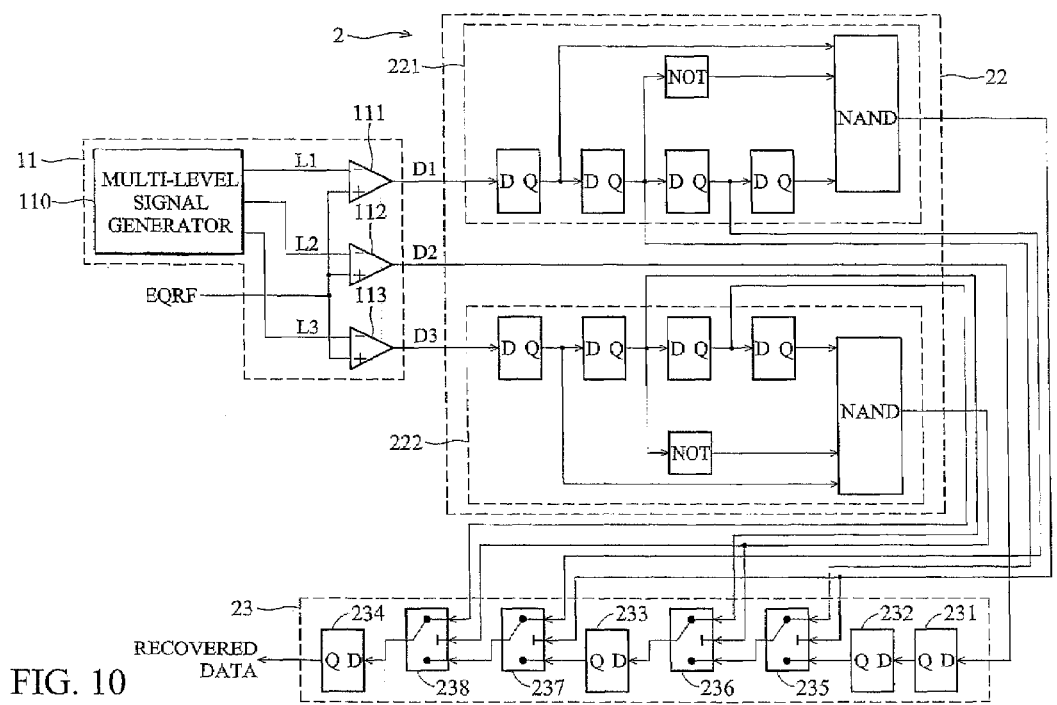
FIG. 10 is a detailed schematic circuit diagram of the second preferred embodiment of an apparatus for data recovery according to the present invention.

FIG. 10 shows a detailed schematic circuit diagram of a data decoding apparatus 2 in the second preferred embodiment of the present invention. Different from the first preferred embodiment, in the second embodiment, aside from being able to detect data segments (0110 or 1001) of the digital data with the minimum run length limit (d'), the apparatus 2 can further detect data segments (0100 or 1011) of the digital data with the minimum run length limit (d'−1). As illustrated, the apparatus 2 also includes a multi-level comparison unit 11, a detection logic unit 22, and a data composer 23. The detection logic unit 22 includes first and second detection circuits 221, 222. The first detection circuit 221 of the detection logic unit 22 includes four cascaded D-type flip-flops, a NOT gate, and a three-input NAND gate. The first D-type flip-flop receives the digital data (D1). The NOT gate is connected to an output of the second D-type flip-flop. The NAND gate is connected to outputs of the first and fourth D-type flip-flops, and to the NOT gate. The second detection circuit 222 of the detection logic unit 22 includes four cascaded D-type flip-flops, a NOT gate, and a three-input NOR gate. The first D-type flip-flop receives the digital data (D3). The NOT gate is connected to an output of the second D-type flip-flop. The NOR gate is connected to outputs of the first and fourth D-type flip-flops, and to the NOT gate.

The data composer 23 includes four D-type flip-flops 231–234 and first to fourth (2×1) multiplexers 235–238. The first D-type flip-flop 231 receives the digital data (D2), and has an output connected to the second D-type flip-flop 232. The output of the second D-type flip-flop of the first detection circuit 221 and the output of the second D-type flip-flop 232 of the data composer 23 serve as data inputs of the first 2×1 multiplexer 235, whereas the output of the NAND gate of the first detection circuit 221 serves as a control input of the first 2×1 multiplexer 235. The output of the second D-type flip-flop of the second detection circuit 222 and the output of the first 2×1 multiplexer 235 serve as data inputs of the second 2×1 multiplexer 236, whereas the output of the NOR gate of the second detection circuit 222 serves as a control input of the second 2×1 multiplexer 236. The output of the second 2×1 multiplexer 236 is connected to the third D-type flip-flop 233 of the data composer 23. The output of the third D-type flip-flop of the first detection circuit 221 and the output of the third D-type flip-flop 233 serve as data inputs of the third 2×1 multiplexer 237, whereas the output of the NAND gate of the first detection circuit 221 serves as a control input of the third 2×1 multiplexer 237. The output of the third D-type flip-flop of the second detection circuit 222 and the output of the third 2×1 multiplexer 237 serve as data inputs of the fourth 2×1 multiplexer 238, whereas the output of the NOR gate of the second detection circuit 222 serves as a control input of the fourth 2×1 multiplexer 238. The output of the fourth 2×1 multiplexer 238 is connected to the fourth D-type flip-flop 234 of the data composer 23. The recovered data is obtained from the fourth D-type flip-flop 234.

Taking the data sequence of FIGS. 7(a) to 7(f) as an example, when the second detection circuit 222 of the detection logic unit 22 detects a data segment (0110) of the digital data (D3), a logic '1' is provided to the second and fourth 2×1 multiplexers 236, 238 of the data composer 23 such that the second and third bits "11" of the data segment (0110) of the digital data (D3) from the second and third D-type flip-flops of the second detection circuit 222 will be selected. As such, the original data segment (0100) of the digital data (D2) received by the data composer 23 becomes (0110) so as to meet the requirement of the minimum run length limit (d') in the recovered data.

In addition, taking the data sequences of FIGS. 11(a) to 11(f) and 12(a) to 12(f) as another example, when a data segment (0100) or (0000) of the digital data (D2) is received by the data composer 23, and the second detection circuit 222 of the detection logic unit 22 simultaneously detects a data segment (0100) of the digital data (D3), the NOR gate of the second detection circuit 22 will provide a logic '1' output to control the second and fourth 2×1 multiplexers 236, 238 of the data composer 23 such that the second and third bits "10" of the data segment (0100) of the digital data (D3) from the second and third D-type flip-flops of the second detection circuit 222 will be selected. As such, the original data segment (0100 or 0000) of the digital data (D2) received by the data composer 23 becomes (0100) in the recovered data. The "10" in the data segment (0100) of the recovered data will be marked as an erroneous bit during decoding for later correction.

Figure 13:
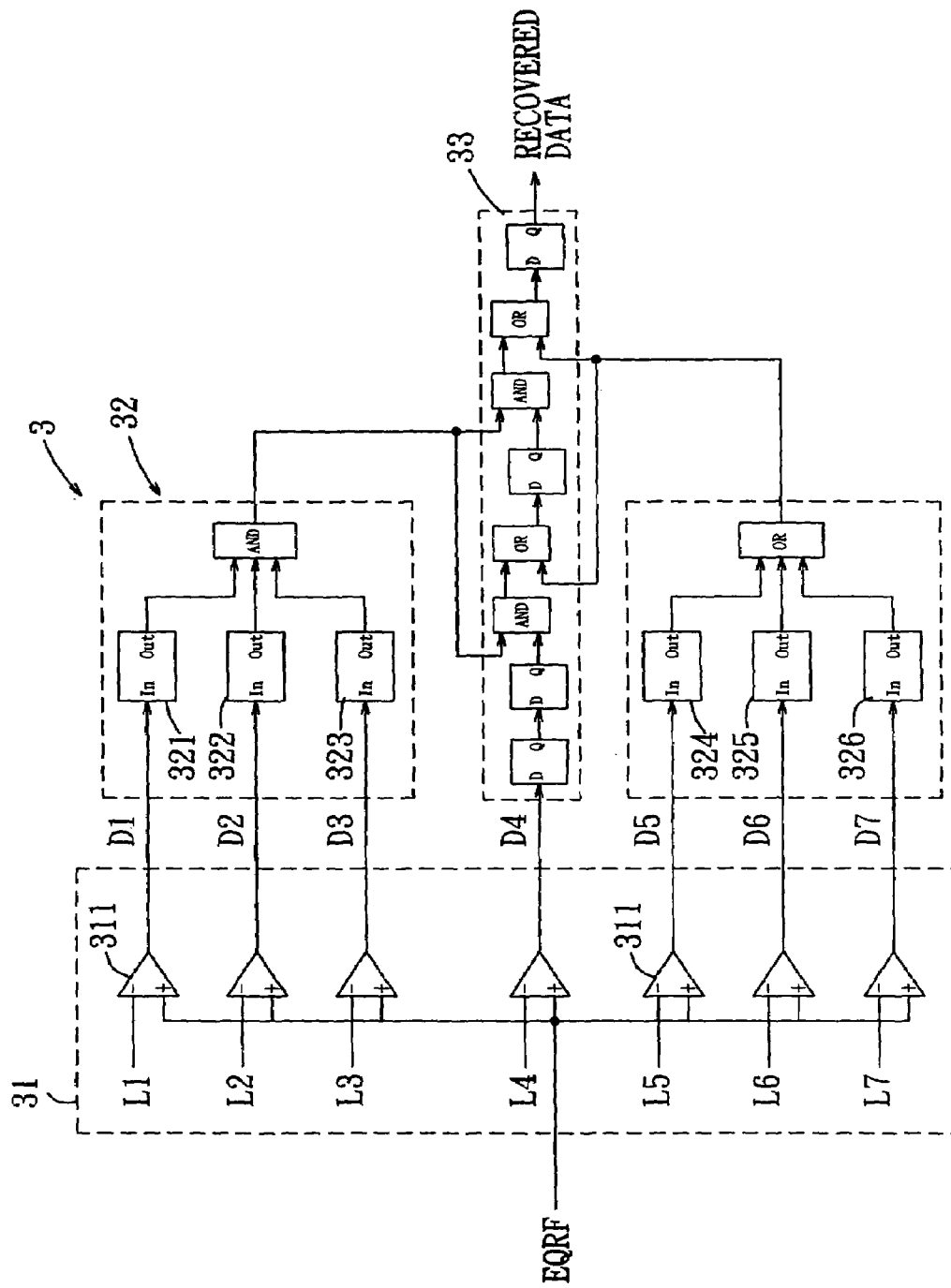
FIG. 13 is a detailed schematic circuit diagram of the third preferred embodiment of an apparatus for data recovery according to the present invention.

FIG. 13 shows a detailed schematic circuit diagram of the third preferred embodiment of an apparatus 3 for data recovery of the present invention. Different from the previous two embodiments, in the third embodiment, the multi-level comparison unit 31 of the apparatus 3 relies upon seven reference signal levels (L1–L7) when decoding the input signal (EQRF). Particularly, three of the reference signal levels (L1–L3) are compared with the input signal (EQRF) by three corresponding comparators 311 so as to generate corresponding sets of digital data (D1–D3) provided to first, second and third detection circuits 321, 322, 323 of the detection logic unit 32, respectively. The constructions of the detection circuits 321, 322, 323 are similar to that of the first detection circuit 121 in the detection logic unit 12 of the first preferred embodiment. The outputs of the detection circuits 321, 322, 323 are then fed to an AND gate. Another three of the reference signal levels (L5–L7) are compared with the input signal (EQRF) by three corresponding comparators 311 so as to generate corresponding sets of digital data (D5–D7) that are provided to fourth, fifth and sixth detection circuits 324, 325, 326 of the detection logic unit 32, respectively. The constructions of the detection circuits 324, 325, 326 are similar to that of the second detection circuit 122 in the detection logic unit 12 of the first preferred embodiment. The outputs of the detection circuits 324, 325, 326 are then fed to an OR gate. The construction of the data composer 33 is similar to that of the data composer 13 in the first preferred embodiment.

Figure 14:
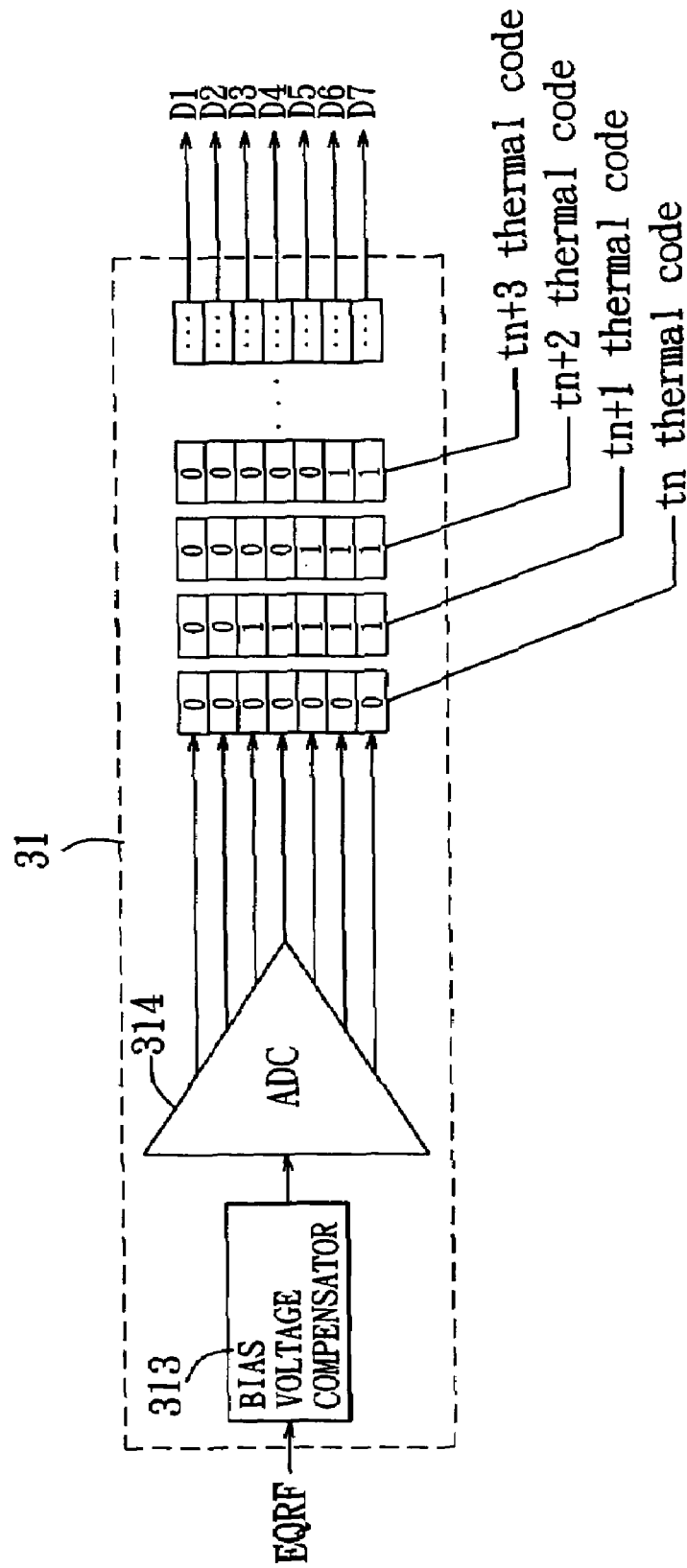
FIG. 14 illustrates a modified multi-level comparison unit of the third preferred embodiment.

FIG. 14 illustrates a modified multi-level comparison unit 31 of the third preferred embodiment. As illustrated, a bias voltage compensator 313 receives the input signal (EQRF) and eliminates a direct current bias component therefrom. The output of the bias voltage compensator 313 is connected to a seven-level analog-to-digital converter (ADC) 314, which compares the bias-compensated input signal with seven reference signal levels (L1–L7) to generate seven sets of digital data (D1–D7). Here, the digital data (D1–D7) are arranged into seven rows from the top to the bottom, where the input signal is associated with seven thermal codes from the analog-to-digital converter 314 at any specified instant (tn, tn+1, tn+2. . . ).

Figure 15:
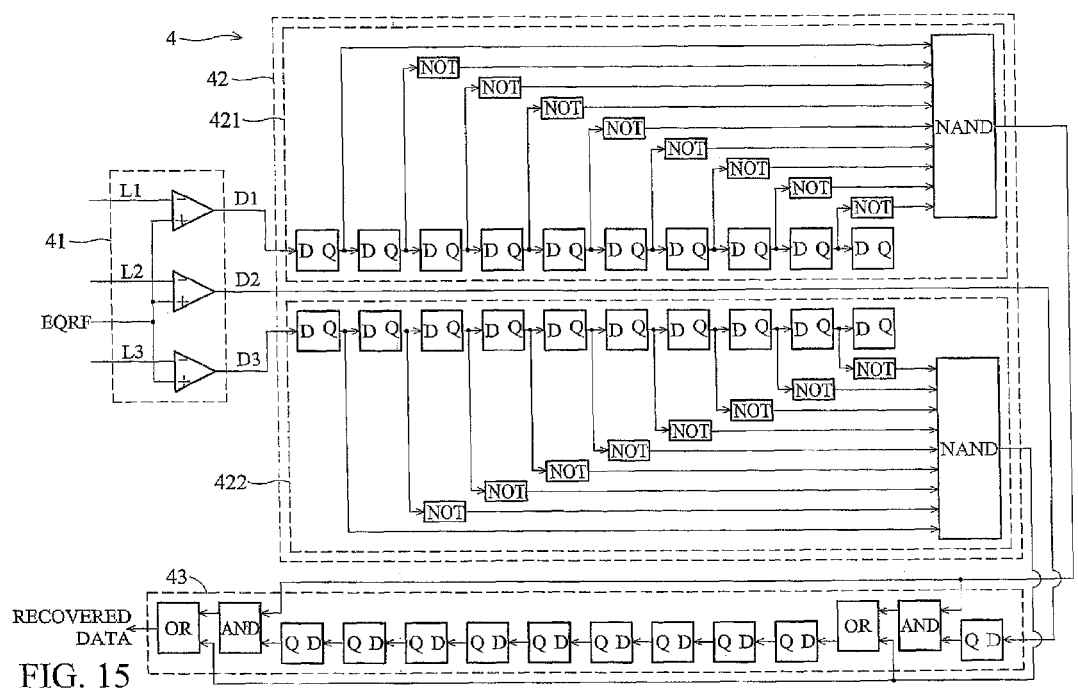
FIG. 15 is a detailed schematic circuit diagram of the fourth preferred embodiment of an apparatus for data recovery according to the present invention.

FIG. 15 shows a detailed schematic circuit diagram of the fourth preferred embodiment of an apparatus 4 for data recovery of the present invention. The fourth preferred embodiment is applicable to detect data segments (1000000001 and 0111111110) having a maximum run length limit (k'=k+1=8). In this embodiment, the detection length of the first and second detection circuits 421, 422 of the detection logic unit 42 are equal to (k'+2) bits. The first detection circuit 421 includes ten cascaded D-type flip-flops and eight NOT gates. Each of the NOT gates respectively connects to every output of the second through ninth D-type flip-flops. The outputs of the first and tenth D-type flip-flops, as well as the eight NOT gates, are connected to a single OR gate. The second detection circuit 422 similarly includes ten cascaded D-type flip-flops and eight NOT gates. Each of the NOT gates respectively connects to every output of the second through ninth D-type flip-flops. However, the outputs of the first and tenth D-type flip-flops, as well as the eight NOT gates, are connected to a single AND gate. The data composer 43 includes ten D-type flip-flops. The output of the first D-type flip-flop and the output of the OR gate of the first detection circuit 421 are connected to a first AND gate. The output of the first AND gate and the output of the AND gate of the second detection circuit 422 are connected to a first OR gate. The output of the first OR gate is connected to the second D-type flip-flop. The second through tenth D-type flip-flops are cascade-connected. The output of the tenth D-type flip-flop and the output of the OR gate of the first detection circuit 421 are connected to a second AND gate. The output of the second AND gate and the output of the AND gate of the second detection circuit 422 are connected to a second OR gate. The digital data (D2), which serves as primary digital data, is received by the first D-type flip-flop of the data composer 43 from the multi-level comparison unit 41. The recovered data is obtained from the second OR gate of the data composer 43.

Taking the data sequence of FIGS. 16(a) to 16(f) as an example, when the second detection circuit 422 detects a data segment (1000000001) of the digital data (D3), the AND gate thereof outputs a logic '1' to the first and second OR gates in the data composer 43. By this way, the first and tenth bits of the data segment (1000000000) (which does not conform with the maximum run length limit k'=8) of the digital data (D2) are forced to be logic '1', such that the data segment (1000000001) in the decoding information outputted from the data composer 43 will conform with the maximum run length limit k'=8.

Similarly, when the first detection circuit 421 detects a data segment (0111111110) of the digital data (D1), the OR gate outputs a logic '0' to the first and second AND gates in the data composer 43. By this way, the first and tenth bits of the data segment (x11111111x, where x is 0 or 1) of the digital data (D2) are forced to be logic '0', such that the data segment (0111111110) in the decoding information outputted from the data composer 43 will conform with the maximum run length limit k'=8.

In the foregoing embodiments, digital data are expressed in NRZ modulation only for illustrative purposes. It can be readily appreciated by those skilled in the art that the present invention can be modified for further application to digital data expressed in NRZI modulation. By detecting digital data with data segments having a minimum run length limit d'=d+1 (NRZ) or d(NRZI), a minimum run length limit (d'−1), and a maximum run length limit k'=k+1 (NRZ) or k (NRZI), and by correcting corresponding bits in primary data received by a data composer, the recovered data outputted by the data composer will conform with the (d, k) encoding constraints. As a result, in high-density data recording applications, the present invention can effectively lower data error rates.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A method for data recovery, comprising the steps of:
    a) comparing an input signal with M reference signal levels to generate M digital data, the number M being greater than or equal to 2;
    b) performing logic operations upon specified lengths over the M digital data to obtain a result, wherein the logic operations determine whether a run length between same symbols in each digital data is equal to the run length encoding constraint; and
    c) generating a recovered data conforming with a run length encoding constraint based on the M digital data obtained in step a) and the result obtained in step b).

2. The method as claimed in claim 1, wherein step c) includes: selecting one of the M digital data obtained in step a) as a primary digital data; and correcting the primary digital data based on the result of the logic operations obtained in step b) to generate the recovered data.

3. The method as claimed in claim 1, wherein the run length encoding constraint is a minimum run length encoding constraint in either NRZ modulation or NRZI modulation, in NRZI modulation, the minimum run length encoding constraint being equal to (d), indicating that the number of '0's between two neighboring '1's must be at least equal to (d), in NRZ modulation, the minimum run length encoding constraint being equal to (d'=d+1), indicating that the number of '0's or '1's must be at least equal to (d').

4. The method as claimed in claim 3, wherein the specified length of the digital data in step b) is at least (d'+2) bits.

5. The method as claimed in claim 1, wherein the run length encoding constraint is a maximum run length encoding constraint in either NRZ modulation or NRZI modulation, in NRZI modulation, the maximum run length encoding constraint being equal to (k), indicating that the number of '0's between two neighboring '1's must not be greater than (k), in NRZ modulation, the maximum run length encoding constraint being equal to (k'=k+1), indicating that the number of '0's or '1's must not be greater than (k').

6. The method as claimed in claim 5, wherein the specified length of the digital data in step b) is at least (k'+2) bits.

7. The method as claimed in claim 1, wherein each of the M reference signal levels in step a) is fixed.

8. The method as claimed in claim 1, wherein each of the M reference signal levels in step a) is adjustable.

9. The method as claimed in claim 3, wherein in NRZ modulation, the logic operations in step b) determine whether a run length between same symbols in each one of the digital data is equal to (d'−1).

10. An apparatus for data recovery, comprising:
    a multi-level comparison unit for comparing an input signal with M reference signal levels to generate M digital data, the number M being greater than or equal to 2;

a detection logic unit for performing logic operations over the M digital data-to obtain a result, wherein the logic operations are to determining whether a run length between same symbols in each one of the digital data is equal to the run length encoding constraint; and a data composer for generating recovered data conforming with a run length encoding constraint based on the M digital data obtained from said multi-level comparison unit and the result from said detection logic unit.

11. The apparatus as claimed in claim 10, wherein said data composer selects one of the M digital data obtained from said multi-level comparison unit as a primary digital data, and corrects the primary digital data based on the result from said detection logic unit to generate the recovered data.

12. The apparatus as claimed in claim 10, wherein the run length encoding constraint is a minimum run length encoding constraint in either NRZ modulation or NRZI modulation, in NRZI modulation, the minimum run length encoding constraint being equal to (d), indicating that the number of '0's between two neighboring '1's must be at least equal to (d), in NRZ modulation, the minimum run length encoding constraint being equal to (d'=d+1), indicating that the number of '0's or '1's must be at least equal to (d').

13. The apparatus as claimed in claim 12, wherein the specified length of the digital data is at least (d'+2) bits.

14. The apparatus as claimed in claim 10, wherein said multi-level comparison unit includes a multi-level signal generator for generating the reference signal levels.

15. The apparatus as claimed in claim 10, wherein said multi-level comparison unit includes a signal generator generating the M reference signal levels in accordance with the input signal.

16. The apparatus as claimed in claim 10, wherein said multi-level comparison unit includes: a level setting device for generating the M fixed reference signal levels; a bias voltage compensator for receiving the input signal and for eliminating a direct current bias component therefrom; and a variable gain amplifier coupled to said bias voltage compensator for amplifying an output signal thereof; said multi-level comparison unit further comparing the amplified output signal with the M reference signal levels.

17. The apparatus as claimed in claim 10, wherein said multi-level comparison unit includes a M level analog-to-digital converter, said M level analog-to-digital converter generating said M digital data based on said input signal.

18. The apparatus as claimed in claim 10, wherein the run length encoding constraint is a maximum run length encoding constraint in either NRZ modulation or NRZI modulation, in NRZI modulation, the maximum run length encoding constraint being equal to (k), indicating that the number of '0's between two neighboring '1's must not be greater than (k), in NRZ modulation, the maximum run length encoding constraint being equal to (k'=k+1), indicating that the number of '0's or '1's must not be greater than (k').

19. The apparatus as claimed in claim 18, wherein the specified length of the digital data is at least (k'+2) bits.

20. The apparatus as claimed in claim 12, wherein in NRZ modulation, said detection logic unit performs the logic operations to determine whether a run length between same symbols in each one of the digital data is equal to (d'−1).

* * * * *